S. BROWN.
PRINTED AND FOLDED SHEET.
APPLICATION FILED FEB. 4, 1919.
1,363,081.  Patented Dec. 21, 1920.
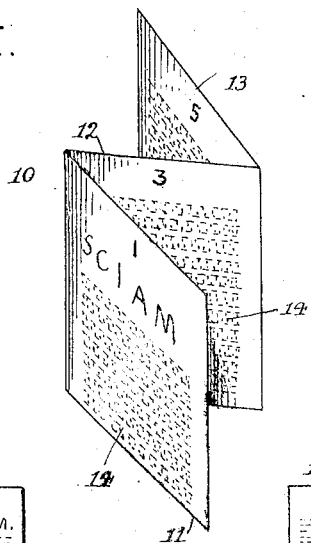
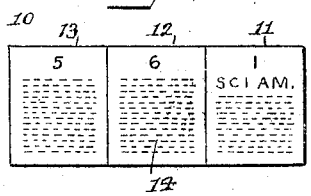
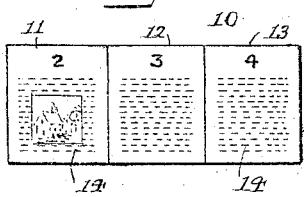
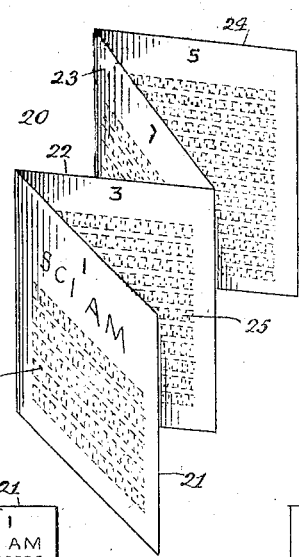
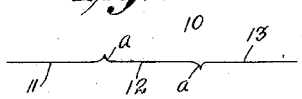
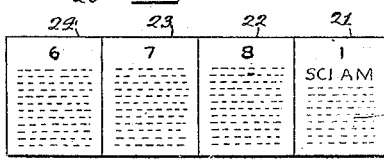
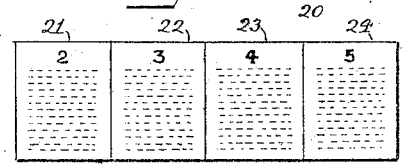
WITNESSES
INVENTOR
SUMMERS BROWN
BY
ATTORNEYS

UNITED STATES PATENT OFFICE.

SUMMERS BROWN, OF LONDON, ENGLAND.

PRINTED AND FOLDED SHEET.

1,363,081.  Specification of Letters Patent.  Patented Dec. 21, 1920.

Application filed February 4, 1919. Serial No. 274,952.

*To all whom it may concern:*

Be it known that I, SUMMERS BROWN, a subject of the King of Great Britain, and a resident of London, England, have invented a new and Improved Printed and Folded Sheet, of which the following is a full, clear, and exact description.

The object of the invention is to provide a new and improved printed and folded sheet having, at least, three leaves or six pages and containing on each page printed matter which may be current news, printed music or other reading matter, illustrations with accompanying text and the like, and arranged to enable the user to readily turn the leaves from the right to the left to successively bring to the view of the reader the pages in proper sequence. Another object is to provide a printed and folded sheet which takes up comparatively little room when folded and which enables the user to open it for reading page by page without spreading the sheet far apart.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a perspective view of the printed sheet having three leaves or folds partly opened up;

Figs. 2 and 3 are face views of the printed sheet shown in Fig. 1 and with the leaves opened up and extended;

Fig. 4 is a perspective view of the printed sheet having four leaves or folds partly opened up;

Figs. 5 and 6 are face views of the same with the leaves fully opened up; and

Fig. 7 is an edge view of the sheet shown in Fig. 3.

The printed sheet 10 shown in Figs. 1, 2 and 3 consists essentially of three leaves 11, 12 and 13 adapted to be folded one upon the other in accordion plait fashion. The leaves 11, 12 and 13 are provided on both faces with printed matter 14 representing news, music or other reading matter, illustrations and text or the like, thereby forming printed pages. The matter 14 appears in sequence on turning the leaves 11, 12 and 13 over from the right to the left. The pages in the sequence mentioned are numbered consecutively. By reference to Figs. 1, 2 and 3 it will be noticed that the printed matter 14 or the page numbers of the pages on one side of the sheet do not appear in sequence, as indicated in Fig. 2, which discloses that the pages 5, 6 and 1 appear on one face of the sheet while the pages 2, 3 and 4 appear on the other face of the sheet. It will further be noticed that the first page appears on the rear face of the sheet together with the last pages, while the remaining pages 2, 3, 4 appear on the front face of the sheet, but when the leaves are folded one upon the other as described page 1 is uppermost, as will be readily understood by reference to Fig. 1.

The user of the printed and folded sheet has before him the uppermost page 1, and after finishing reading this page the user turns the leaf 11 over from the right to the left so that pages 2 and 3 are next exposed, and when finished reading these pages the user turns over from the right to the left the leaves 12 and 13 which exposes page 4. Then after finishing this page the user folds over from the right to the left the leaf 13 thus exposing the pages 5 and 6. The printed sheet 20 shown in Figs. 4, 5 and 6 comprises the leaves 21, 22, 23 and 24 connected with each other in accordion plait fashion folded one upon the other, and each leaf is provided on both faces with printed matter 25 of the nature above mentioned to form pages, the reading matter appearing in proper sequence on folding the leaves over from the right to the left, the same as above described. The pages are numbered consecutively in the sequence of the reading matter and it will be noticed that the page numerals on one face of the sheet do not appear in sequence, as will be readily seen in Fig. 5, which shows pages 6, 7, 8 and 1 on one face of the sheet 20 and pages 2, 3, 4 and 5 on the other face of the sheet. When the leaves are folded one upon the other, page 1 is uppermost, and on turning the the leaves over from the right to the left as above explained the printed matter on the successive pages will appear in the proper sequence.

In practice, a single sheet of paper is used and provided with vertical creases arranged alternately on opposite faces of the sheet to provide the connected pages shown and above described, but I do not limit myself to this particular mode of forming the sheet as the leaves may be hinged together in any suitable fashion at their side edges to form folds or plaits of accordion fashion.

Although I prefer that each leaf is printed on both faces it is evident that one or more pages may be left blank, if desired.

Having thus described my invention, I claim as new and desire to secure by Letters Patent:—

1. As an article of manufacture, a printed sheet comprising a series of leaves sidewise connected with each other to fold one upon the other in accordion plait fashion, the leaves being provided with printed matter on both faces thereby forming printed pages, the printed matter on the pages appearing in sequence on turning the leaves over from the right to the left to the end page of the sheet on one side thereof and continuing the turning in the same direction to the beginning page on the other side of the sheet, the first page appearing on one side of the printed sheet together with the last pages, and the remaining pages appearing on the other side of the printed sheet.

2. As an article of manufacture, a printed sheet comprising a single sheet provided with vertical creases alternately on opposite sides of the sheet thereby dividing the sheet into at least three connected leaves adapted to fold one upon the other in accordion plait fashion, the leaves being provided with printed matter on both faces to form printed pages, the printed matter on the pages appearing in sequence as the leaves are turned over from the right to the left to the end page on one side of the sheet and continued in the same direction from the said end page back to the first page.

3. As an article of manufacture, a printed sheet comprising a single sheet provided with vertical creases alternately on opposite sides of the sheet and dividing the sheet into at least three connected leaves adapted to fold one upon the other in accordion plait fashion, the leaves being provided with printed matter on both faces to form printed pages, the printed pages being provided with consecutive page numbers arranged in sequence on turning the leaves over from right to left, the said printed matter on the leaves appearing in the same sequence as the consecutively numbered pages.

SUMMERS BROWN.